June 25, 1929.  H. J. PFIESTER  1,718,702
COMPOSITE PANEL AND ATTACHING DEVICE THEREFOR
Filed March 30, 1928
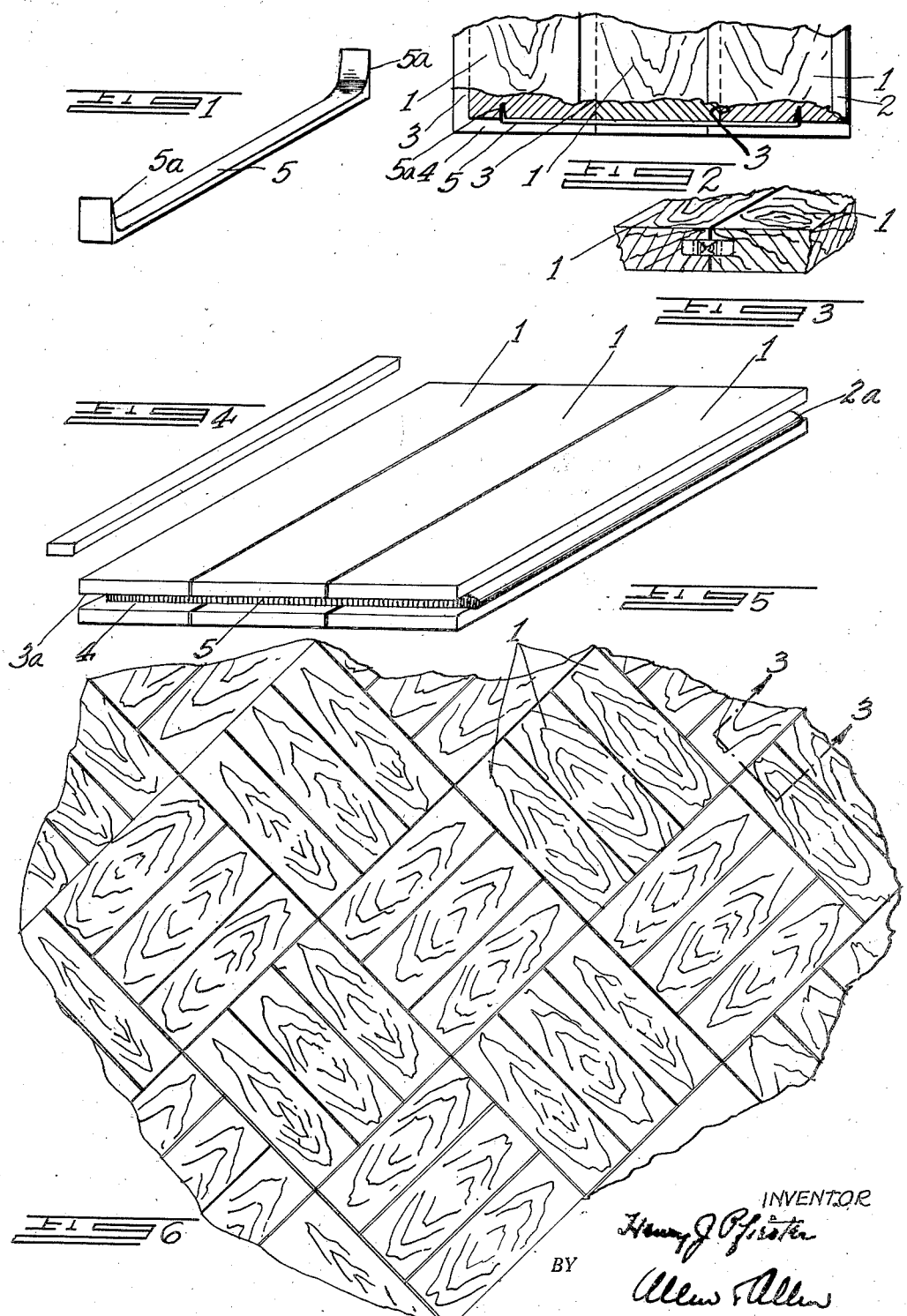
INVENTOR
Henry J. Pfiester
BY
Allen & Allen
ATTORNEYS Patented June 25, 1929.

1,718,702

UNITED STATES PATENT OFFICE.

HENRY J. PFIESTER, OF CINCINNATI, OHIO, ASSIGNOR TO THE M. B. FARRIN LUMBER COMPANY, OF CINCINNATI, OHIO, A CORPORATION OF OHIO.

COMPOSITE PANEL AND ATTACHING DEVICE THEREFOR.

Application filed March 30, 1928. Serial No. 266,043.

My invention relates to composite panels for parquette flooring and the like, and to attaching devices for securing together the individual pieces forming the panels or blocks.

In the art there has been considerable development in the use of the waste ends of flooring pieces which are cut to size and matched to form composite panels which are then set or secured in the flooring in different arrangements in which the grain of the wood in one panel is at an angle to the grain of the wood in another.

It is the object of my invention to provide a new type of composite panel or block which is held together by novel reinforcing cleats which bind the individual pieces of flooring together in such a way that an article of manufacture having a much wider range of utility than has heretofore been possible, is thereby provided.

The above broad object and other specific objects to which reference will be made in the ensuing disclosure I accomplish by that certain combination and arrangement of parts of which I have shown a preferred embodiment.

In the drawings:—

Figure 1 is a perspective view of one of my attachments or cleats for holding the individual pieces of the block together.

Figure 2 is a plan view of a composite block composed of three pieces with portions cut away to reveal the method of inserting the cleats to bind the pieces together.

Figure 3 is a sectional view of a joint between panels as indicated by the lines 3—3 in Figure 6.

Figure 4 is a perspective view of a wooden spline for forming a tongue and groove connection between adjacent panels.

Figure 5 is a perspective view of a composite block composed of three pieces of flooring.

Figure 6 is a plan view of an area of parquette flooring in which the blocks are laid in an alternate arrangement with the grain of the wood in each block at an angle to the grain of the wood in the blocks immediately adjacent thereto.

The composite blocks are made of short pieces of flooring such as are indicated at 1 with the width of each piece being such with respect to its length that when the several pieces are joined together a geometric figure will be formed which may be laid with other blocks to form a designed floor or wall panelled area. While I have shown a block composed of three pieces each being three times as long as its width, I may use four pieces each being four times as long as wide, or I may vary the proportion of length to width in any desired manner.

Each piece 1 has the longitudinal edges which are in alignment with the direction of the grain of the wood provided with a tongue 2 and a groove 3 so that the pieces may be assembled in longitudinal alignment to form the composite block which will have one longitudinal edge with a tongue and one edge with a groove as indicated at $2^a$, $3^a$, in Figure 5. The lateral edges of the blocks, that is those edges which do not have the tongues and grooves $2^a$ and $3^a$, are provided with grooves 4 which are of substantially the same depth as the grooves 3, although the end grooves may be slightly deeper to accommodate the cleats which hold the individual pieces together.

Within each end groove I propose to insert a cleat such as is indicated at 5 in Figure 1. The cleat is preferably made of a stamped out piece of sheet metal of suitable width to seat firmly within the walls of the edge groove 4. The cleats 5 have turned down ends $5^a$ which form prongs which may be driven into the wood as indicated. Each prong will preferably have a flat outer surface which will lie approximately at right angles to the body of the cleat, and a rounded or beveled inner surface which, when the prongs of a cleat are inserted, will tend to draw the individual pieces forming the block together.

It will be noted that the metal cleats, although they will bend readily flatwise, will be very rigid in the direction of their width and that the lateral edges of the cleat will tend to brace the thin overhanging portions of the ends of the blocks on each side of the end grooves. Thus the cleats provide supports for the blocks which reinforce them in their weakest portions, that is along the portions on each side of the grooves.

For securing the blocks together I further provide thin strips of wood of such width as will dovetail snugly within the edge grooves so that the blocks may be secured together to form a floor of desired pattern, such, for example, as the parquette flooring area indicated in Figure 6.

It will further be obvious that modifications in the particular shape of block or the number of pieces forming it, or the design of floor which may be laid, will readily occur to those skilled in the art without departing from the principle of my invention which is primarily the provision of cleats which will tend to bind the pieces within each block firmly together and which will further reinforce the blocks in their weakest positions, that is at their edge joints.

The blocks may be imbedded in asphaltic or other cementitious compositions, or merely nailed to the false floor, but whatever method of securing the blocks in the flooring or wall panelling is used, the blocks may be laid in a very strong unit which is braced to resist warping at the edge joints.

Having thus described my invention, what I claim as new and desire to secure by Letters Patent, is:—

1. A composite block composed of pieces of lumber having the grain of each piece in alignment one with another, and with tongue and groove connections uniting the individual pieces together, said composite block having lateral edge grooves with metal cleats inserted within the grooves, said cleats having prongs which extend into the wood in the direction of the grain thereof, said cleats being of such width as to provide reinforcement for the thin overhanging portions of the pieces at the ends thereof provided with grooves.

2. A composite block composed of pieces of lumber having the grain of each piece in alignment one with another, and with tongue and groove connections uniting the individual pieces together, said composite block having lateral edge grooves with metal cleats inserted within the grooves, said cleats being of such width as to provide reinforcement for the thin overhanging portions of the pieces at the ends thereof provided with grooves.

3. A composite block composed of pieces of flooring having end grooves and being bound together with metal cleats at end edges thereof, said cleats being countersunk within the end grooves of the pieces, said cleats being of such width as to support overhanging portions of the pieces adjacent the end grooves.

HENRY J. PFIESTER.